United States Patent
Tomizuka et al.

(10) Patent No.: US 10,572,101 B2
(45) Date of Patent: Feb. 25, 2020

(54) CROSS-PLATFORM MULTI-MODAL VIRTUAL COLLABORATION AND HOLOGRAPHIC MAPS

(71) Applicant: Taqtile, Inc., Seattle, WA (US)

(72) Inventors: John Tomizuka, Seattle, WA (US); Dirck Schou, Seattle, WA (US)

(73) Assignee: TAQTILE, INC., Seattle, WA (US)

( * ) Notice: Subject to any disclaimer, the term of this patent is extended or adjusted under 35 U.S.C. 154(b) by 0 days.

(21) Appl. No.: 15/813,090

(22) Filed: Nov. 14, 2017

(65) Prior Publication Data

US 2018/0136815 A1    May 17, 2018

Related U.S. Application Data

(60) Provisional application No. 62/421,854, filed on Nov. 14, 2016.

(51) Int. Cl.
| | |
|---|---|
| *G06F 3/0481* | (2013.01) |
| *G06F 16/29* | (2019.01) |
| *G06F 16/9537* | (2019.01) |
| *G06F 3/01* | (2006.01) |
| *G06F 3/0484* | (2013.01) |
| *G06F 3/16* | (2006.01) |
| *G06T 19/20* | (2011.01) |

(Continued)

(52) U.S. Cl.
CPC .......... *G06F 3/04815* (2013.01); *G06F 3/011* (2013.01); *G06F 3/04845* (2013.01); *G06F 3/167* (2013.01); *G06F 16/29* (2019.01); *G06F 16/9537* (2019.01); *G06T 19/20* (2013.01); *G06F 3/017* (2013.01); *G06T 2219/024* (2013.01); *G06T 2219/2004* (2013.01); *G10L 15/265* (2013.01); *H04L 65/4015* (2013.01)

(58) Field of Classification Search
CPC .................................................... G06F 3/0482
USPC ......................................................... 715/728
See application file for complete search history.

(56) References Cited

U.S. PATENT DOCUMENTS

| 10,395,428 B2 * | 8/2019 | Stafford ................... G06T 11/60 |
| 2012/0249416 A1 * | 10/2012 | Maciocci ................ G06F 3/011 |
| | | 345/156 |
| 2014/0146394 A1 | 5/2014 | Tout et al. |

(Continued)

FOREIGN PATENT DOCUMENTS

KR            10-1665363 B1     10/2016

OTHER PUBLICATIONS

PCT/US2017/61642 International Search Report and Written Opinion dated Jul. 2, 2018, 19 pages.

*Primary Examiner* — William D Titcomb
(74) *Attorney, Agent, or Firm* — Han Santos, PLLC; Gloria M. Steinberg

(57) ABSTRACT

The present disclosure relates to a collaboration platform for multiple modes and types of user devices used in virtual mapping products. A holographic mapping application utilizes a collaboration platform to view, edit, and manipulate holographic map images. The platform includes re-useable modules that function with virtually any type of virtual reality user equipment. The holographic mapping application is operable with different types and modes of user devices, including virtual reality headsets (i.e., goggles), conventional 2-D platforms such as cell phones, tablets and PCs, without regard for the manufacturer of the user equipment.

20 Claims, 8 Drawing Sheets

(51) Int. Cl.
*G10L 15/26* (2006.01)
*H04L 29/06* (2006.01)

(56) References Cited

U.S. PATENT DOCUMENTS

| | | | |
|---|---|---|---|
| 2016/0026253 A1* | 1/2016 | Bradski | G02B 27/225 |
| | | | 345/8 |
| 2016/0063762 A1 | 3/2016 | Heuvel et al. | |
| 2017/0109936 A1* | 4/2017 | Powderly | G06F 3/013 |
| 2017/0358141 A1* | 12/2017 | Stafford | G06F 3/0482 |

\* cited by examiner

CROSS-PLATFORM MULTI-MODAL VIRTUAL COLLABORATION AND HOLOGRAPHIC MAPS

CROSS-REFERENCE TO RELATED APPLICATION

This application is related to, and claims priority to, U.S. Provisional Patent Application Ser. No. 62/421,854, entitled "Cross-Platform Multi-Modal Virtual Collaboration and Holographic Maps," filed Nov. 14, 2016.

BACKGROUND

Presently, there are several different modes of providing users with virtual experiences. In one mode, virtual reality (VR), a user's experience comes solely (or almost solely) from computer generated content. An example of a VR user device, is an Oculus Rift®, which provides a fully computer generated visual experience that appears to completely surround the user.

In another mode, augmented reality (AR), a user's experience is primarily from real world experiences, but those real-world experiences are overlaid with computer generated content, to "augment" the real experience. An example of an AR user device is the Microsoft HoloLens®, which presents the user computer generated images, but where the user can still see the real world.

Note that because AR can provide as much, or as little overlaid computer-generated content as a situation calls for, AR does not assume that the overlaid computer-generated content is via a three-dimensional (3-D) head display. A display may be two-dimensional (2-D). For example, Pokémon Go® is a video game played on a mobile phone, which overlays virtual "pocket monsters" to be captured via mobile phone mechanics.

In general, AR can emphasize the real world, such as in a fighter plane heads up display, or can provide an experience dominated by computer generated content. Accordingly, sometime virtual experiences that combine real world and computer-generated content are denoted by the general term, mixed reality (MR).

The different modes of virtual experiences have resulted in a plethora of user devices. However, computer applications where these user devices collaborate have the collaboration logic within the application itself rather than in a general collaboration platform.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 6 is a diagram of an example 3-D holographic map image with a real-time messaging system overlay.

DETAILED DESCRIPTION

The present disclosure relates to a collaboration platform for multiple modes and types of user devices used in virtual mapping products. Presently, there is no general collaboration platform. Part of the reason is that there are different modes of virtual experiences. While the term MR is intended to be more inclusive, it still excludes pure VR experiences. To cover all modes, the term (X)R (i.e., VR, MR, AR, etc.) may be used. Thus, there is no general collaboration platform across heterogeneous platforms, i.e., for (X)R, let alone one that lends itself to common standards for object placement in a virtual experience or user interface conventions for sharing control and sharing presentation.

Furthermore, different applications have different goals in sharing data. Applications can interface with different sources of data, both proximate and remote, both proprietary and public, but presently there is no platform to facilitate such data exchange. The present disclosure relates to such a platform.

Figure 1:
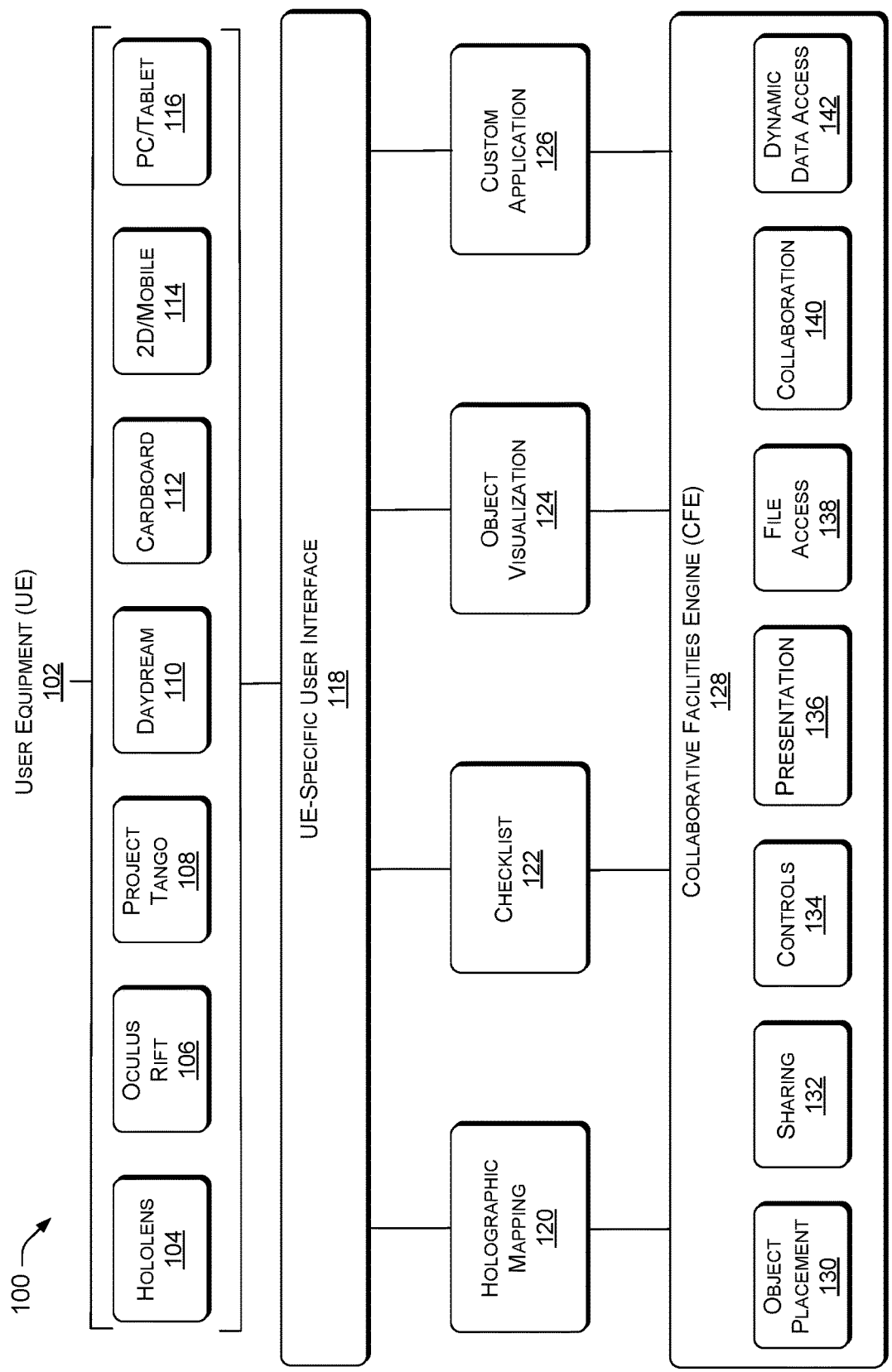
FIG. 1 is a block diagram of an example cross-collaboration platform for virtualization applications.

FIG. 1 is a block diagram of an example cross-collaboration platform 100 for virtualization applications. The example cross-collaboration platform 100 is a general platform that enables virtualization applications to perform certain operations, including but not limited to:

(1) Receiving data from and writing to an arbitrary user interface, for any virtual experience mode (i.e., AR, VR, MR, etc.).

(2) Performing 3-D data visualization and analysis between users;

(3) Enabling 3-D information technology workers and developers to maintain 3-D models and experiences, maintain (X)R applications, and to provide support to end users;

(4) Providing a common set of collaborative experiences, including data transfer, annotation and overlays; and (5) Making use of a common set of lower-level (X)R collaborative facilities, including for object placement, sharing, control management, and data sharing.

The example cross-collaboration platform 100 includes one or more of a number of different types of user equipment 102. Examples of user equipment 102 shown in the example cross-collaboration platform 100 include a HoloLens® device 104, an Oculus Rift® device 106, a Project Tango® device 108, a Daydream® device 110, a Cardboard® device 112, or any other type of user device made to operate within a virtual context. In addition to devices specifically produced for virtualization applications, the user equipment 102 may also include a handheld 2-D device 114, such as a mobile phone, and/or a generic computing device 116, such as a personal computer, a tablet computer, or the like. Although specific examples of branded products are shown, it is noted that they are for example purposes only, and the user equipment 102 may be any type of user device that is suitable for use with any type and mode of virtualization application.

The example collaborative platform 100 also includes a user equipment (UE)-specific user interface (UI) 118. Applications that communicate with the UE-specific UI 118 support any X(R) user equipment 102 that is supported by the UE-specific UI 118. The UE-specific UI 118 correlates to any compatible user equipment 102 used with the example collaborative platform 100. As such, the user equipment 102 can functionally operate with the collaborative platform 100 without modification to the user equipment 102. In at least one alternative implementation, more than one UE-specific UI 118 may be included in the collaborative platform 100, which enables the collaborative platform 100 to functionally operate with more than one type of user device.

The example collaborative platform 100 also includes several example applications including a holographic mapping application 120, a checklist application 122, an object visualization application 124, and a custom application 124 that can make use of any of the features described with respect to the example collaborative platform 100. The holographic mapping application 120 is described in greater detail, below.

The holographic mapping application 124 utilizes various features of the example collaborative platform 100 to manipulate, annotate, and otherwise interact with a holographic 3-D map. The holographic mapping application is described in greater detail, below.

The checklist application 122 is a mixed-reality solution for hands-free authoring of step-by-step instructions, allowing users to perform inspections, maintenance, and other complex tasks. The checklist application 122 uses features of the example collaborative platform 100 to assist operators in learning and executing complex tasks. Use of the checklist application 122 allows an operator to learn from pre-stored instructions or to collaborate live with a demonstrator to receive instructions that include visible and audible direction, and to manipulate and annotate virtual objects in furtherance of understanding a complex task.

The object virtualization application 124 enables collaborative holographic visualization of optimized 3-D models, including annotation and markup, and IoT ("Internet of Things") integration. The object virtualization application 124 can be used to display individual or collections of optimized 3-D objects. Whether these objects are conceptual in nature, real-world discreet manufactured items, or 3-D scans of sculptures, paintings, or people, the object virtualization application 124 displays a virtual representation within a user's physical environment.

The object virtualization application 124 can be used to explore digital user interfaces for physical objects, or can be combined with real-world prototypes to overlay a user interface upon a real-world object in order to test and evaluate human-machine interaction and interface design. The object virtualization application 124 enables co-located and remote collaboration. Any markups or annotations made by users is persisted together with a 3-D object, thus enabling both synchronous and asynchronous collaboration.

The object virtualization application 124 also provides a platform upon which the virtual representation of a real-world object can be viewed. For example, the object virtualization application 124 can overlay a live feed of IoT data regarding an actual product, display simulation data, and provide links to associated content such as user-manuals, videos, maintenance history, and more.

The holographic mapping application 120, the checklist application 122, and the object visualization application 124 are merely examples of applications that can make use of the example collaborative platform 100. Likewise, the custom application 126 is any virtualization application that can make use of various features of the example collaborative platform 100 that are included in a collaborative facilities engine 128, which is a part of the example collaborative platform 100. Some of the features included in the collaborative facilities engine 128 are described below.

The collaborative facilities engine 128 provides a standard library that is available to perform certain virtualization operations in conjunction with various user equipment 102. In the present example, the collaborative facilities engine 128 includes components for object placement 130, sharing 132, controls 134, presentation 136, file access 138, collaboration 140, and dynamic data access 142. The collaborative facilities engine 128 components 130-142 are standard components that are used by all virtualization applications using the example collaboration platform 100. Thus, applications may re-use components even when working with different user devices.

The object placement component 130 allows a user interface component to identify an object and place the object on a specific location in a virtual map, including a 3-D holographic map. The object can be any type of data object that has a visual component. The object can include a static image or a dynamic image that changes when object data changes.

The sharing component 132 provides a utility that allows a first user to share a view (i.e., a map) with a second user or with multiple other users. As such, multiple users can access the same vision space, allowing each of the multiple users to manipulate the view and/or share information with the other users.

The controls component 134 is the executive function (i.e., operating system) of the virtuality engine 128 that provides access to virtuality engine 128 components and controls operations therewith. The presentation component 136 is a common utility that is used by applications (such as the custom application 126) to take input data and create a UI presentation view for one or more users. The file access component 138 controls access to data files that are used for presentation views, overlays, etc.

The collaboration component 140 provides communications capabilities across multiple users that may be using different types or brands of user equipment. The collaboration component 140 allows results of actions taken by one user to be viewed or heard by one or more other users. The collaboration component 140 also assists in persisting changes made to a presentation view by one or more users. The dynamic access component 142 maintains links to data sources that are needed for a presentation view and that provide data that is updated during operation of the system.

Example Operating Environment

Figure 2:
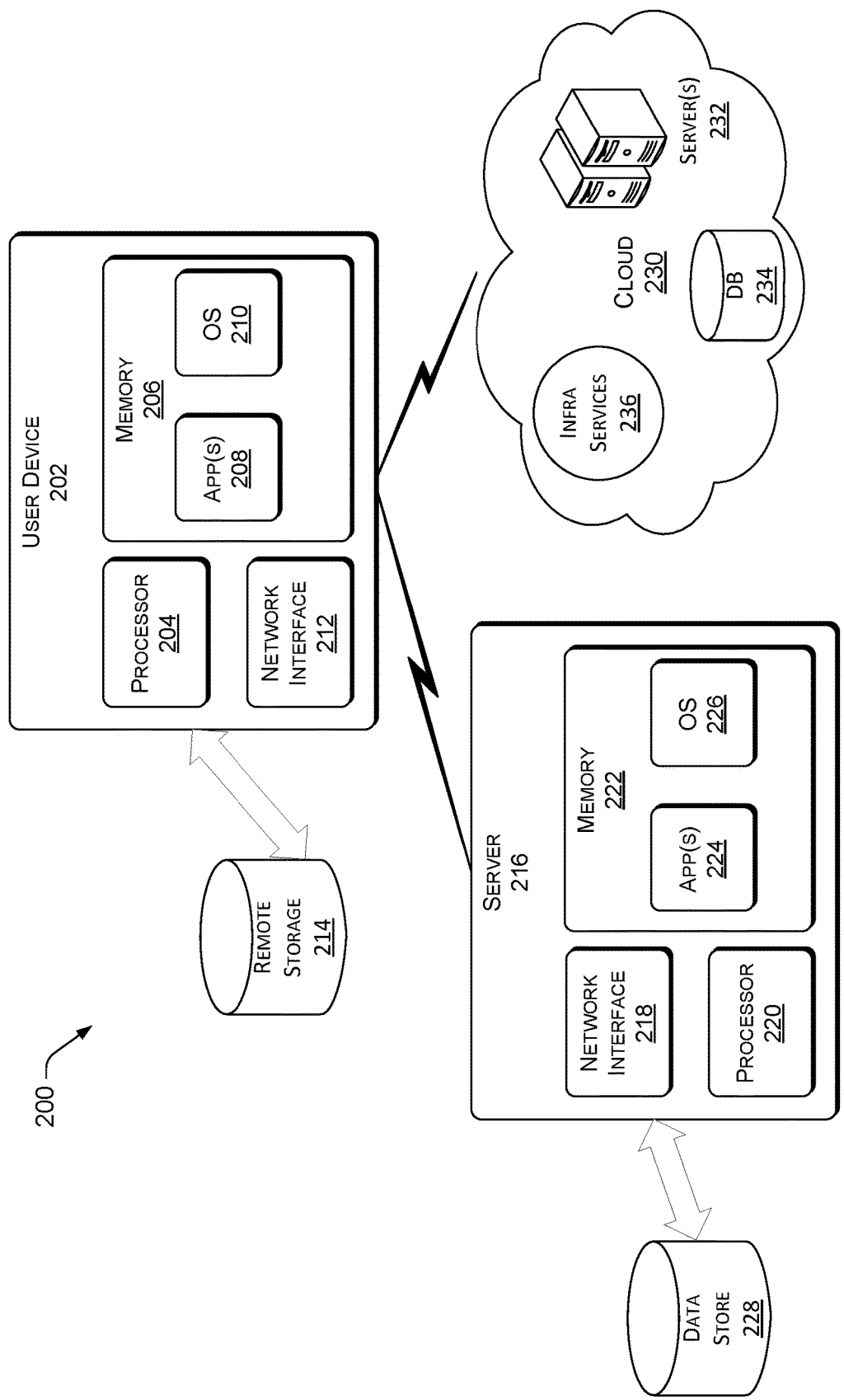
FIG. 2 is a diagram of an example environment in which the technological solutions described herein may be implemented.

Prior to disclosing (X)R collaboration and related techniques, an exemplary hardware, software and communications environment is disclosed. FIG. 2 illustrates several possible embodiments of a hardware, software and communications environment 200 for (X)R collaboration and related techniques.

User device 202 is any computing device. Exemplary user devices include without limitation various VR, AR, and MR (i.e., (X)R) user equipment but may also include, tablet computers, smart phones, and personal computers. (X)R collaboration and related techniques may be used in a number of platform contexts. Although (X)R collaboration and related techniques may be brought to bear on a typical networked user device 202 accessing a remote server, (X)R collaboration and related techniques alternatively may be implemented on a standalone computer. Accordingly, those techniques might be performed on a client device 202 that is a portable laptop, or a portable embedded system.

A user device 202 may have a processor 204 and a memory 206. User device 202's memory 206 is any computer-readable media which may store several software components including an application 208 and/or an operating system 210. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

To participate in a communications environment, user equipment device 202 may have a network interface 212. The network interface 212 may be one or more network interfaces including Ethernet, Wi-Fi, or any number of other physical and data link standard interfaces. In the case where the user need only do operations on a standalone single machine, the network interface 212 is optional.

User device 202 may communicate to a server 216. Server 216 is any computing device that may participate in a network. The network may be, without limitation, a local area network ("LAN"), a virtual private network ("VPN"), a cellular network, or the Internet. The client network interface 212 may ultimate connect remote networked storage 214, or to server 216 via server network interface 218. Server network interface 218 may be one or more network interfaces as described with respect to client network interface 212. Server 216 also has a processor 220 and memory 222. As per the preceding discussion regarding client device 202, memory 222 is any computer-readable media including both computer storage media and communication media.

In particular, memory 222 stores software which may include an application 224 and/or an operating system 226. Memory 218 may also store applications 224 that may include without limitation, an application server and a database management system. In this way, client device 202 may be configured with an application server and data management system to support a multi-tier configuration.

Server 216 may include a data store 228 accessed by the data management system. The data store 228 may be configured as a relational database, an object-oriented database, a NoSQL database, and/or a columnar database, or any configuration to support scalable persistence.

The server 216 need not be on site or operated by the client enterprise. The server 216 may be hosted in the Internet on a cloud installation 230. The cloud installation 230 may represent a plurality of disaggregated servers which provide virtual web application server 232 functionality and virtual database 234 functionality. Cloud 230 services 232, 234 may be made accessible via cloud infrastructure 236. Cloud infrastructure 236 not only provides access to cloud services 232, 234 but also billing services. Cloud infrastructure 236 may provide additional service abstractions such as Platform as a Service ("PAAS"), Infrastructure as a Service ("IAAS"), and Software as a Service ("SAAS").

Collaborative Virtualization Platform Implementation Stack

Figure 3:
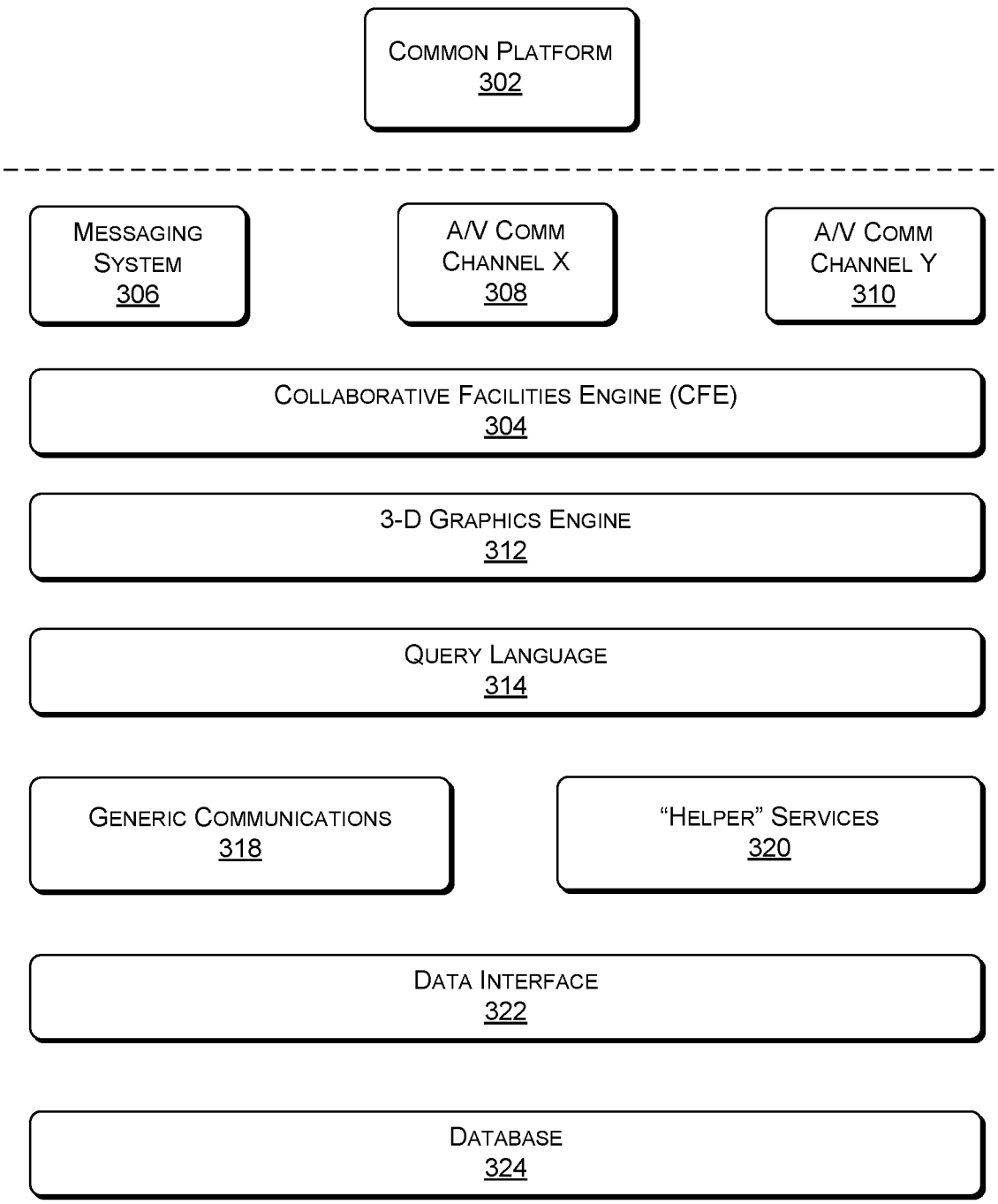
FIG. 3 is a block diagram of an example collaboration virtualization platform (CVP) implementation stack in accordance with the technologies described herein.

FIG. 3 is a block diagram of an example collaborative virtualization platform implementation stack 300 in accordance with the technologies described herein. The example collaborative virtualization platform implementation stack 300, in conjunction with a host platform (e.g., a common platform 302 comprising an operating system, execution environment/virtual machine, and other runtimes comprising the full operating platform; examples include a cell phone, HoloLens®, Oculus Rift®, etc.), provides a platform for a 3-D/(X)R collaborative application. FIG. 3 illustrates an exemplary implementation stack 300 for a collaborative facilities engine (CFE) 304.

The implementation stack 300 provides a messaging system 306 that enables chat, voice, and other non-A/V communications message feeds regardless of the type of user equipment used. More particularly, the messaging system 306 handles the conversation of messaging across different modes of user experiences so that an AR application may message a VR application, which may message a 2-D/Mobile application, etc. The messaging system 306 allows users to communicate with each other via voice, text, mail, etc., even if the users are located remotely from one another or are using different types or brands of user equipment (e.g., goggles vs. cell phone).

Multiple audio/visual (AV) communications channels provide 3-D AV feeds to multiple users. AV Communication Channel X 308 and AV Communication Channel Y 310 are shown as examples of discrete communication channels. It is noted that although only two communication channels are shown, virtually any number of communication channels may be implemented.

A 3-D graphics engine/environment 312 provides 3-D and graphics capabilities for the CFE 304 and, ultimately, for the common platform 302. The 3-D graphics engine/environment 312 can be a custom engine or it can be a graphics engine available as a market product, such as Unite, Unreal®, or other such product. The 3-D graphics engine/environment 312 provides a platform to implement computer generated audio and visual feeds.

The CFE 304 provides a generic facility to support data exchange. Accordingly, the CFE 304 is built upon a client-side defined query language 314. Rather than predefining application programming interfaces (API) with preset fields, client-side defined queries enable the client to dynamically determine what data is retrieved, and how the data is bound. The query mechanism makes use of strong type checking to perform on-the-fly type conversion and/or error checking in binding. The query language 314 can be a commercial product, such as GraphQL®, SQL®, LINQ®, etc.

The CFE 304 may use generic communication components 318 such as a socket cluster (e.g., BSD sockets) and/or third-party facilities. For example, chat and messaging may be furnished by a provider, such as Rocket.Chat®. In addition, the CFE 304 is extensible and supports any number of helper services 320 to interface with other services (e.g., Twitter®, etc.). Some helper services may be third-party services. By way of example, the Lightning Enterprise Asset Management® platform may be used as a helper service in one or more implementations.

The example implementation stack 300 also utilizes a data interface 322 and a database 324. Session state, static data stores, and dynamic data may be stored in a distributed, potentially NoSQL database 324 such as MongoDB®. The database 324 is programmatically exposed via a high-throughput, concurrent data interface 322 such as Node.js®, for example.

Generally, it can be seen how the CFE 304 can be implemented with numerous and various off-the-shelf products to create an efficient 3-D holographic application development environment. This robustness of the CFE 304 provides an advantage to 3-D holographic application developers by allowing 3-D holographic applications to focus on key AV features that provide a heightened user experience rather than on peripheral support components necessary to create an entire 3-D holographic platform.

Example 3-D Map

Although the virtual collaboration systems described herein can be used in many types of applications, the following discussion relates to particular implementations of holographic mapping applications in a cross-platform multi-modal virtual collaboration system. Generally, the described implementations provide, inter alia, dynamic loading of places and data layers, 3-D layering of data sets over maps; a presentation mode and a collaboration mode; and geospatial data over maps.

The techniques described below enable users to display topography, infrastructure, and buildings as a 3-D virtual (holographic) model of virtually any size, while integrating with various data sources to bring contextually relevant information to the same view. Models can be presented to multiple users at once, providing a way for a user to present to colleagues, either in the same room or remotely. In the course of operations, users may place objects on the map or move objects on the map. Furthermore, a presenter and/or collaborators may add user generated content such as text notes or 3-D ink annotations to be viewed within a shared session or saved for later viewing.

The mapping techniques described below may be integrated with other mapping repositories and/or services to view a city and/or a landmark as a 3-D holographic model. The described techniques also provide an ability to navigate through a holographic model while simultaneously overlaying real-time data such as current weather and forecast, traffic flow lines and incidents, geo-tagged tweets, etc.

Collaborative Virtualization Application

Figure 4:
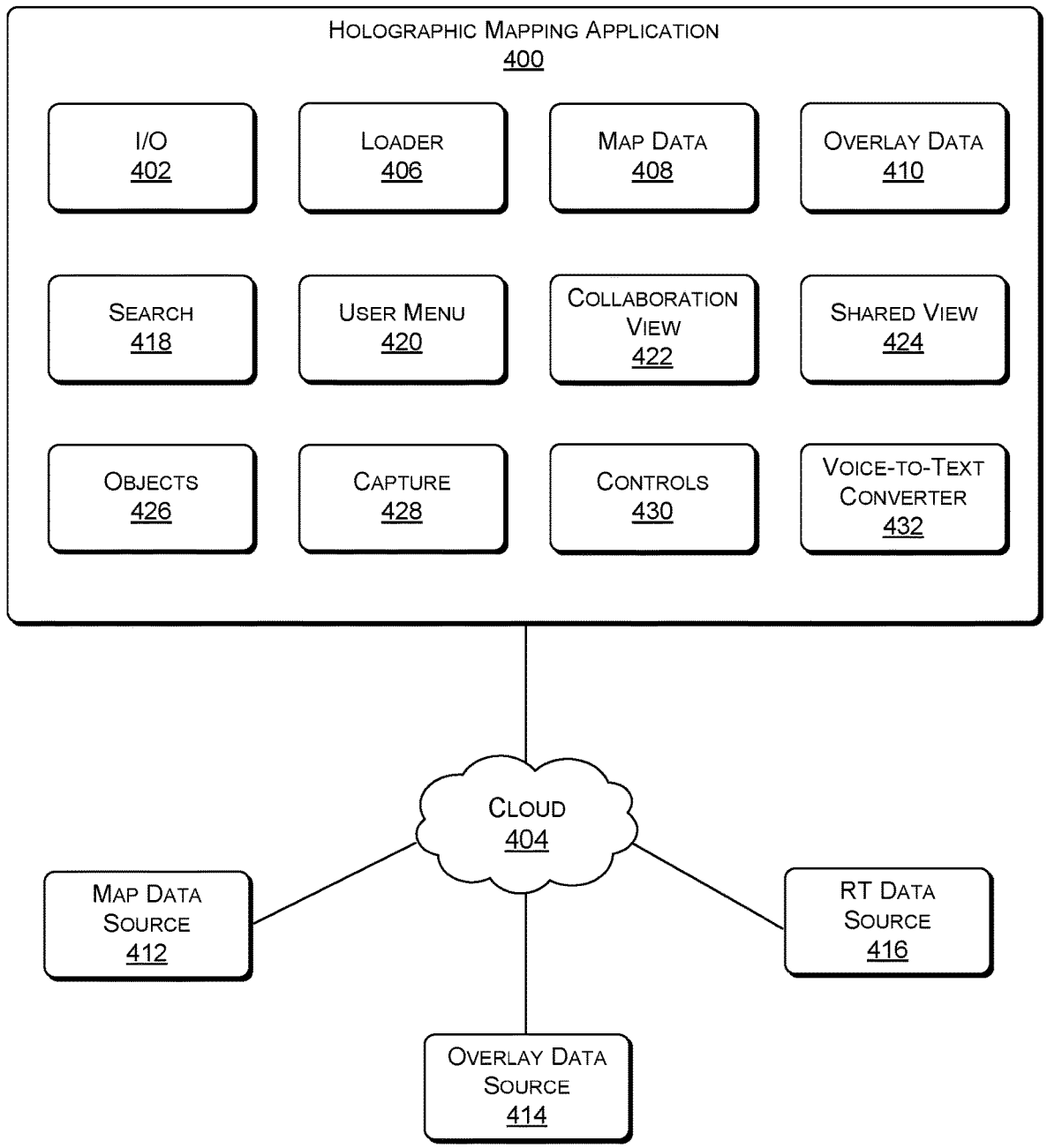
FIG. 4 is a diagram of an example 3-D holographic map image.

FIG. 4 is a block diagram of an example holographic mapping application 400 in accordance with the present description. The holographic mapping application 400 is similar to the holographic mapping application 120 shown in FIG. 1. The holographic mapping application 400 is shown as a collection of components to which particular functions have been assigned. Interactions between the components to achieve these functions are discussed in the discussion related to FIG. 4 and to subsequent figures. The components may be implemented in hardware, software, firmware, or a combination thereof. It is noted that although a function may be attributed to a particular component, FIG. 4 shows just one of many alternative implementations of a holographic mapping application. Therefore, alternate implementations may perform similar functions with alternative components or with a combination of components.

The example holographic mapping application 400 includes an input/output (I/O) module 402 that receives and transmits data and control signals by way of a user interface (UI, FIG. 1 118). The I/O module 402 also includes hardware and/or software components that enable the holographic mapping application 400 to transmit and receive data over a network 404. The example holographic mapping application 400 also includes a loader 406 that locates and loads map data 408 and overlay data 410, each of which may be stored locally or on a remote site accessible via the network 404, such as a map data source site 412 and/or an overlay data source site 414. The loader 406 is also configured to reset a UI view to a default map, receive user input to specify additional map and/or landmark data sources, and to load a higher resolution map for selected portions of a holographic map (such as during zoom), etc. A search component 418 works with the loader 406 to search for maps, such as at the map data source site 412.

Overlay data 410 can include relatively static data such as statistics relevant to the map (such as crime statistics for a city map), street addresses, site names (e.g., buildings or parks), etc. The I/O module 402 is also able to access one or more real-time data source sites 416 via the network 404. The real-time data source sites provide real-time data that changes frequently that can be overlaid on a map. Examples of real-time data include, but are not limited to, weather data, traffic data, subscription feeds, social media feeds, etc.

The example holographic mapping application 400 also includes a user menu 420 which allows a user to display and select all user options that are available, including selectable options for the functions presently described. The user menu 420 may be visible on the map or it may appear upon detection of a certain action by a user.

The example holographic mapping application 400 also includes a collaboration mode 422 that allows a user to invite other users to share a map view and to interact with the map and the other user(s). This can be accomplished by providing a list of contacts that may be selected by the user, or the user may enter a unique user identifier or address for a potential collaborator, or other options may be used that allows a user to invite and add collaborators to the user's view.

The example holographic mapping application 400 also includes a share mode 424 that allows a user to invite one or more other users to view the user's map and actions taken thereupon. The share mode 424 is different from the collaboration mode 422 in that users invited to join a view via share mode 424 cannot interact with the map view. Only the original user can manipulate the original view. This allows a user, such as an instructor, to manipulate a map view to demonstrate to other users, without having to be concerned with the other users changing the original or annotated map view. In share mode 424, only the original user can manipulate a map or add object, overlays, data, etc., to the map.

An objects module 426 is included in the example holographic mapping application 400, and is configured to accept commands from a user to place, manipulate, or remove objects relative to a map. The objects may be images, sticky notes, annotations (inking and text), markers, etc., that may be placed virtually anywhere on the map. Objects may be placed at any arbitrary location on the map view. In at least one implementation, objects may be restricted to a pre-defined location for placement.

The holographic mapping application 400 includes a capture module 428 that is configured to record a view. A view may be recorded in a captured still image (such as screen shot) that may be stored or transmitted. In addition, a video segment can be captured, stored and/or transmitted. The capture module 428 captures all objects present in a user view of a holographic map image, including objects placed during a session, such as notes, ink annotation, markers, etc.

Several controls 430 are available to the example holographic mapping application 400 including, but not necessarily limited to: zoom; pan; rotate; adjust place; adjust size; reset; resize; and reposition. During a "zoom in" operation, a user can point a cursor to a portion of a holographic map and zoom to the location of the cursor. During a "zoom in" operation, additional map and/or landmark data can be retrieved and added to the map to preserve detail appropriate for the resolution presented. Map and/or landmark data may be cached in anticipation of a subsequent "zoom out" operation. The controls 430 may be implemented within the application 400, or may interface with controls in the collaborative facilities engine (CFE, FIG. 1, 128).

In a "zoom out" operation, a map view is zoomed away relative to a location of a cursor. Previously cached map/landmark data, if any, is retrieved and higher resolution data that is no longer required is discarded. A pan operation scrolls a view of a holographic map in an arbitrary direction upon detection of a gesture or menu selection by a user. A rotation operation rotates a view of a holographic map relative to a cursor upon detection of a gesture or menu selection by a user.

An "adjust place," an "adjust size," or "reset" operation, a portion of a holographic map that is actually displayed may be adjusted. The portion of the view may be placed, resized or reset to a default setting. A "resize" or "reposition" operation allows a user to adjust a size and/or position of a map view to correspond to a real-world environment in which it is in. Re-sizing and/or re-positioning may be accomplished by a user gesture, a voice command, or a menu selection.

The example holographic mapping application 400 also includes a voice-to-text converter 432. The voice-to-text convertor 432 allows a user to utilize voice commands to control a holographic map and functions associated therewith. In implementations that utilizes voice commands, a user interface that includes at least one microphone is provided.

Example 3-D Map

Figure 5:
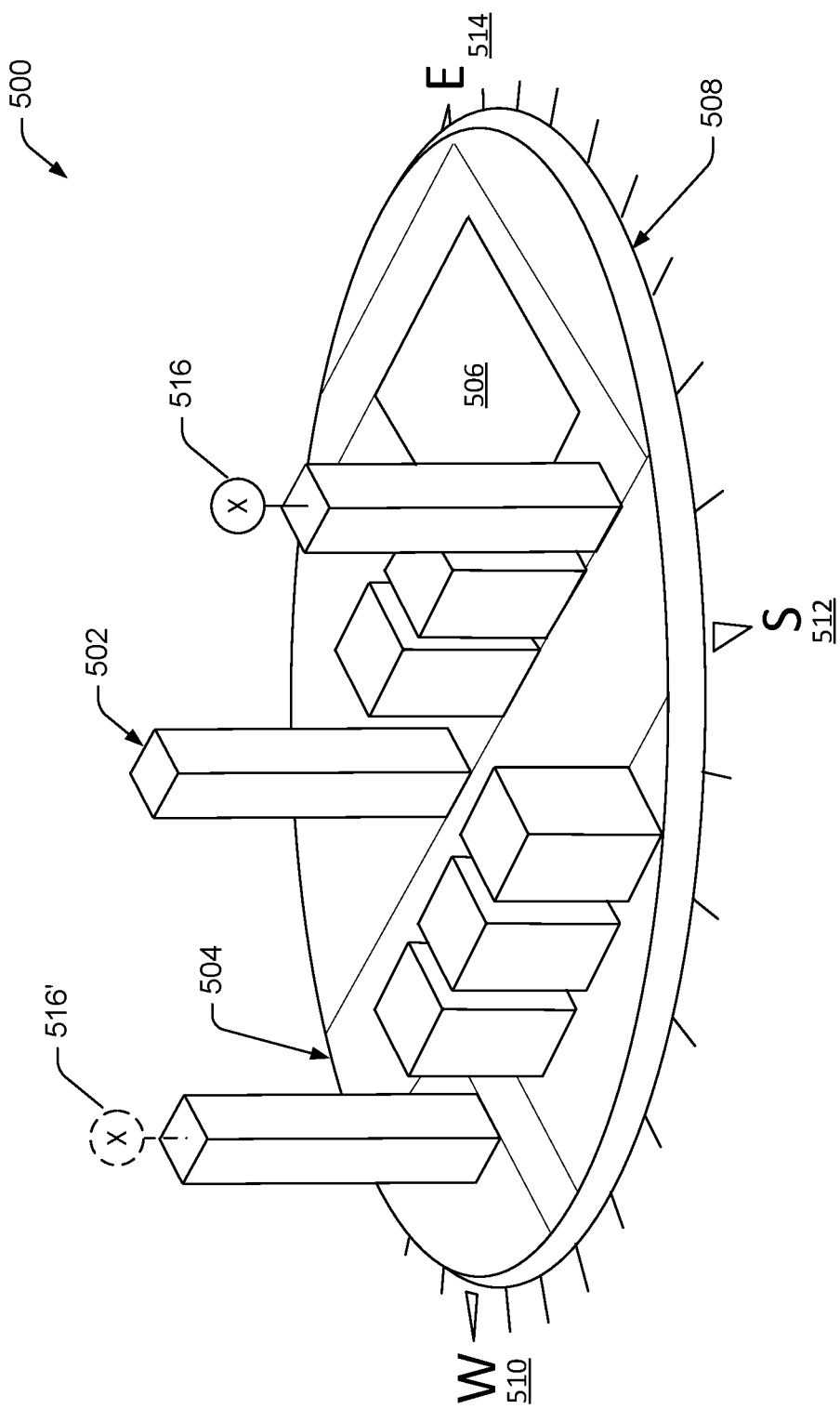
FIG. 5 is a block diagram of an example virtualization application in accordance with the present description.

FIG. 5 is a simplified example 3-D map 500. Although a 3-D map is typically much more detailed, the example 3-D map 500 exemplifies the kind of map that can be displayed, shared, and manipulated using the presently described techniques. The 3-D map 500 is used in FIG. 5 and subsequent figures to demonstrate the user of real-time data overlays, object placement, etc.

The example 3-D map 500 includes a number of buildings 502, streets 504, and a parking lot 506. The example 3-D map 500 is shown juxtaposed on an orientation base 508 that, in this example, is a stylized compass that includes directional points W 510, S 512, and E 514. The example 3-D map 500 also demonstrates a feature for user placement and/or moving objects on the map. A pin 516 is shown that indicates a particular location on the 3-D map 500. The pin 516 is placed on the 3-D map 500 by a user. Subsequently, the user may move the pin 516 to a different location, indicated by a pin 516' shown at the other location.

Although the placed object is shown as a pin in the present example, virtually any type of object may be placed on the map 500 by a user. Objects can be shapes such as arrows, pictures, data such as information about a location proximal to the object, etc. Placed object may also include real-time data objects that maintain live links and display information that is updated periodically.

3-D Map with Weather Overlay

Figure 6:
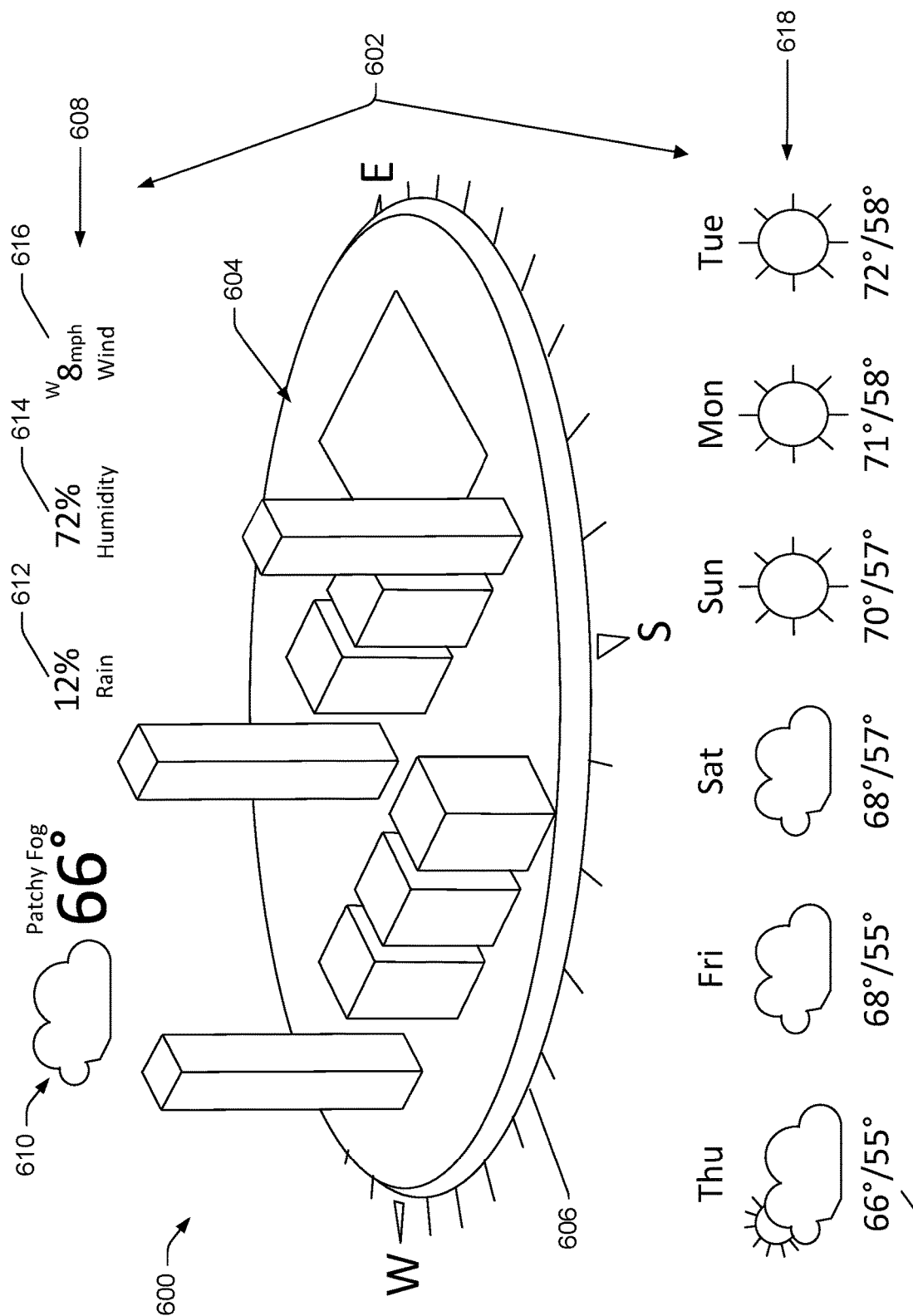
FIG. 6 is a diagram of an example 3-D holographic map image with a real-time weather overlay.

FIG. 6 is a diagram of an example 3-D holographic map image 600 with a real-time weather overlay 602. The example 3-D holographic map image 600 is the same as the simplified example 3-D map 500 shown in FIG. 5, and includes a 3-D map 604 situated atop an orientation base 606. However, a weather overlay 602 is presented with the example 3-D holographic map image 600. The weather overlay 602 may be static, i.e., loaded and not updated, or it may be dynamic, wherein the weather data is periodically updated from a weather data feed, such as the real-time data source site 416 shown in FIG. 4.

The weather data overlay 602 is composed of several elements, which may vary among alternate implementations. In the present example, the weather overlay includes a weather summary bar 608 that provides a summary of current weather conditions. The weather summary bar 608 includes a summary element 610 that indicates temperature, cloudiness, and weather condition (e.g., "Patchy Fog"). The weather summary bar 608 also includes a rain element 612 that indicates a present chance of rain (e.g., "12%"), a humidity element 614 that indicates a current relative humidity (e.g., "72%"), and a wind element 616 that indicates a current wind speed and wind direction.

The weather data overlay 602 further includes a daily forecast bar 618 that provides a weather forecast for each of several upcoming days. For each day shown, a daily forecast object 620 is displayed relative to the day. The daily forecast object 620 indicates a day, a high temperature, a low temperature, and a weather icon. Although the present example shows particular elements in the weather overlay 602, it is noted that alternate elements may be used in addition to or in lieu of one or more of the elements shown. Also, it is noted that fewer or more elements may be used than are shown in the present example.

3-D Map with Messaging System Overlay

Figure 7:
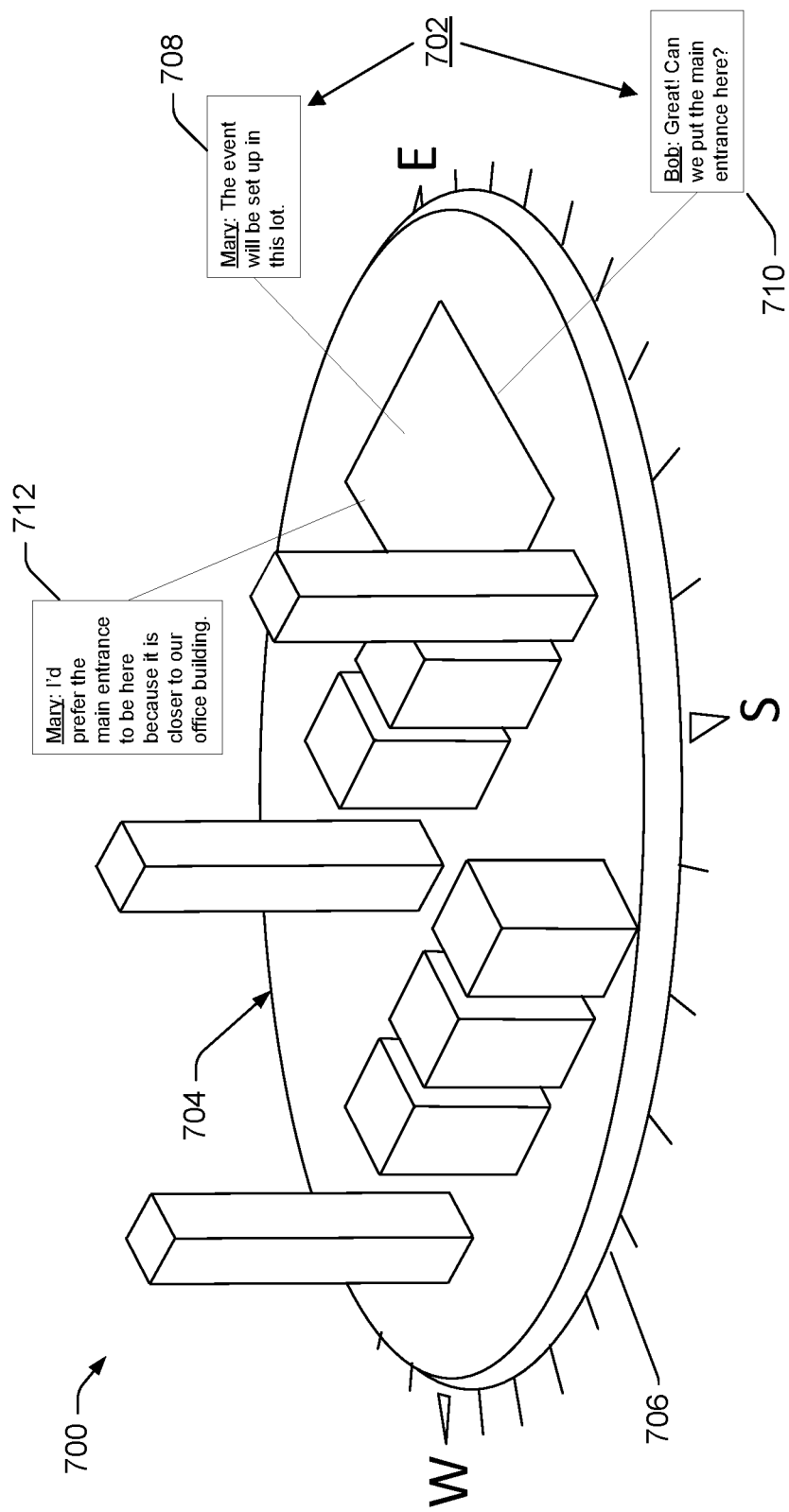

FIG. 7 is a diagram of an example 3-D holographic map image 700 with a real-time messaging system overlay 702. The example 3-D holographic map image 700 is the same as the simplified example 3-D map 500 shown in FIG. 5, and includes a 3-D map 704 situated atop an orientation base 706. However, a messaging system overlay 702 is presented with the example 3-D holographic map image 700.

The messaging system overlay 702 is shown as having two messages, a first message 708 from a first user ("Mary"), and a second message 710 from a second user ("Bob"). The first message 708 and the second message 710 are shown situated in particular places. The messages 708, 710 are placed by the users at a location that helps other users comprehend the message. For example, the first message 708 is from Mary, and states: "The event will be set up in this lot." To indicate the lot to which she is referring, Mary has placed the first message 708 so that it identifies the particular lot in question.

In response to the first message 708, Bob composes the second message 710, which reads: "Great! Can we put the main entrance here?" The second message 710 has been placed at a location that informs Mary of the location to which Bob is referring. By allowing placement of message boxes, the present techniques allow a greater clarification of meaning to be made between users, while also allowing a visual element to replace what would take additional words and user actions.

As the conversation between Mary and Bob continues, additional messages appear in the same boxes as the first message 708 and the second message 710. At any time during the conversation, a user may move the message box that carries the user's messages. In the present example, a third message 712 created by Mary, reads: "I'd prefer the main entrance to be here because it is closer to our office building." As it can be seen, Mary has moved the location of her message box to a new location.

In at least one implementation, when a message box is relocated, the previous message disappears. However, it may be desired to keep the message history. This can be done in one of several ways. In at least one implementation, the message thread continues to be available in the message box. However, this loses important context to the message. In the present example, when Mary moves her message box, the original location pointed to by Mary cannot be explicitly discerned, since it pointed to a different location.

At least one alternate implementation solves this problem by leaving the first message 708 in its original location. To de-emphasize a message box showing a message that was sent before the message box was moved, the original message box may have a visual property changed so it is clear that the message box does not contain a current message. For example, the first message 708 box may be dimmed or grayed out to indicate it is no longer the active message box.

Although only two messengers are shown in the present example, it is noted that all collaborative users are able to present messages and place them at a preferred location. If a system is in a shared mode rather than a collaborative mode, only the primary user (e.g., such as an instructor) has the ability to place messages or other objects on the map view.

Figure 8:
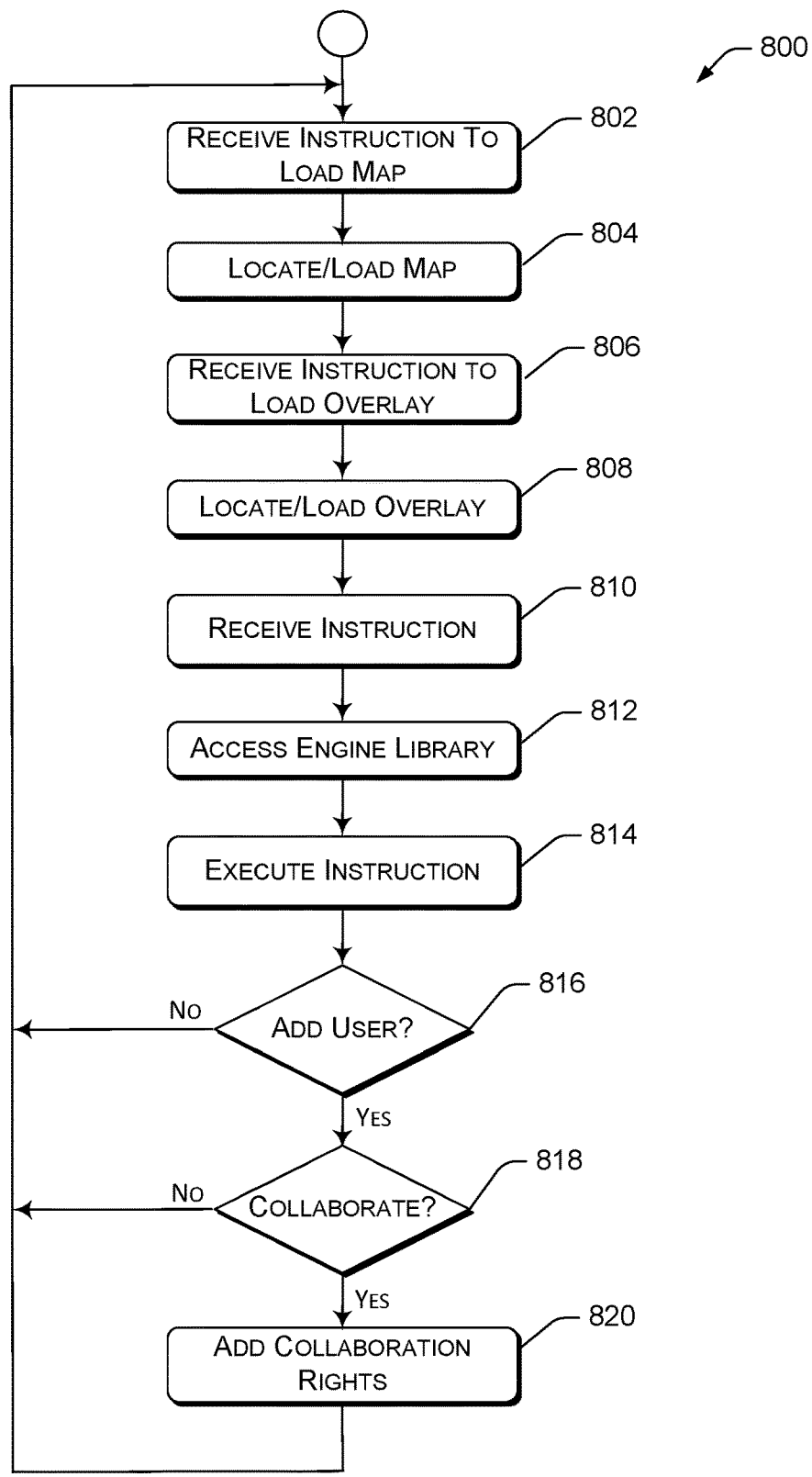
FIG. 8 is a flow diagram of an example methodological implementation for an operational mode of a user support monitor.

FIG. 8 is a flow diagram of an example methodological implementation for an operational mode of a 3-D holographic map application. In the following discussion of FIG. 8, continuing reference is made to elements and reference numerals shown in and described with regard to previous figures. It is noted that, although certain operations are attributed to certain diagram boxes, those skilled in the art will recognize that some operations may be performed together with other steps shown in other boxes and that certain operations may be divided or combined.

At block 802, the example holographic mapping application (FIG. 4, 400) receives a user instruction to load a map. If the map data 408 is co-located with the application 400, then the loader 406 loads to map for viewing at block 804. If map data 408 is not co-located with the application 400, then the search component 418 searches one or more map data source sites 412 via the network 404. Once located, the loader 406 loads the map for viewing.

Similarly, at block 806, the example holographic mapping application 400 receives a user instruction to load map overlay data. If map overlay data 410 is co-located with the application 400, then the overlay data 410 is loaded and displayed contemporaneously with the map data 408. If map overlay data 410 is not co-located with the application 400, then the search component 418 searches one or more overlay data source sites 414 via the network 404. If appropriate overlay data is located, then the loader 406 loads the overlay day for viewing with the map data at block 808.

At block 810, a user instruction is received. The user instruction can be a control instruction, an instruction to create, place, or move an object, a capture instruction, or the like. If executable code to execute the instruction is not located within the application itself, then the application 400 accesses the collaborative facilities engine (FIG. 1, 128) at block 812 and executes one or more instructions therein (block 814).

If a user enters a command to add another user ("Yes" branch, block 816), then it is determined whether the new user should be added as a collaborator at block 818. Otherwise ("No" branch, block 816), the process reverts to block 802. If the new user is to be added as a collaborator ("Yes" branch, block 818), then additional rights are provided to the new user at block 820. Otherwise ("No" branch, block 818), the new user joins the map view as a shared user and does not have extended rights as a collaborator. The process then reverts to block 802.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
   a first user device comprising a first virtual reality application configured to operate within an environment that at least partly includes virtual reality portions;
   a second user device comprising a second virtual reality application configured to interface with the environment concurrently with the first virtual reality application;
   a collaborative facilities engine that includes components that are useable in multiple virtual reality applications comprising the first virtual reality application and the second virtual reality application;
   a three-dimensional (3-D) mapping application configured to access at least one component of the collaborative facilities engine to create a 3-D map that is presented at the first user device;
   a first user device interface that allows a first user of the first user device to execute the 3-D mapping application; and
   a second user device interface that allows a second user of the second user device to execute the 3-D mapping application.

2. The system as recited in claim 1, wherein the first user device is a different type of device than the second user device.

3. The system as recited in claim 2, wherein the first user device further comprises a virtual reality headset, and the second user device further comprises a handheld computing device.

4. The system as recited in claim 1, wherein the collaborative facilities engine further comprises at least one of the following components: an object placement component; a sharing component; a control component; a presentation component; a file access component; a collaboration component; and a dynamic data access component.

5. The system as recited in claim 1, further comprising:
   multiple different user devices and a user-device-specific user interface that corresponds with and operates with each of the different user devices.

6. The system as recited in claim 5, further comprising:
   multiple communications channels that are useable with the different user devices.

7. The system of claim 1, wherein the second user device interface allows the second user of the second user device to execute the 3-D mapping application using the at least one component in the collaborative facilities engine.

8. A holographic mapping application, comprising:
   map data that, when displayed, presents a 3-D holographic map to one or more users;
   map overlay data that is contemporaneously displayable with the map data to present the 3-D holographic map;

at least one type of object that can be displayed with the map data, the object being user selectable, placeable, and moveable;

a search function configured to locate the map data from a remote map data source website, and the map overlay data from a remote overlay data source website; and wherein the holographic mapping application is configured to locate the map data and the map overlay data and display the map data and the map overlay data simultaneously.

9. The holographic mapping application as recited in claim 8, further comprising:

a share mode wherein a first user has primary rights to view, edit, and control the 3-D holographic map displayed using the map data, and a second user has secondary rights to view the 3-D holographic map and view edits and results of the control executed by the first user.

10. The holographic mapping application as recited in claim 8, further comprising:

a collaboration mode wherein a first user and a second user have equal rights to view, edit, and control the 3-D holographic map displayed using the map data.

11. The holographic mapping application as recited in claim 8, further comprising:

a voice-to-text interface whereby a user can issue voice commands to control actions related to the 3-D holographic map.

12. The holographic mapping application as recited in claim 8, further comprising:

a messaging system interface that allows multiple users to communicate with each other via voice, text, and electronic messaging.

13. The holographic mapping application as recited in claim 8, further comprising:

a capture component that is configured to record map presentation views as displayed to one or more users.

14. The holographic mapping application as recited in claim 8, further comprising:

an input/output (I/O) component that is configured to receive real-time data from a remote website and present at least a portion of the real-time data simultaneously with the presenting of the 3-D holographic map.

15. A method, comprising:

receiving a user command from a user to load a specified map;

loading the specified map in response to the user command;

receiving a user instruction related to the specified map;

accessing a collaborative facilities engine to execute the user instruction related to the specified map;

receiving an instruction to add an additional user;

determining if the additional user is to be added in a share mode or in a collaboration mode;

if the additional user is to be added in a collaboration mode, adding the additional user with extended rights to view, edit, and control the specified map; and if the additional user is to be added in a share mode, adding the additional user with basic rights to view the specified map.

16. The method as recited in claim 15, further comprising:

receiving an additional user command to load specific map overlay data;

locating the specific map overlay data; and loading the specific map overlay data to be displayed simultaneously with the specified map.

17. The method as recited in claim 15, further comprising:

searching network websites to locate the specified map.

18. The method as recited in claim 15, further comprising:

changing the additional user currently in the share mode to the collaborative mode, and granting additional rights associated with the collaborative mode to the additional user.

19. The method as recited in claim 15, further comprising:

receiving and executing a first set of commands from a first user via a first user device;

receiving and executing a second set of commands from a second user via a second user device; and wherein the first user device and the second user devices are different types of user devices.

20. The method as recited in claim 19, wherein the first user device is a virtual reality headset, and the second user device is a handheld computing device.

* * * * *